United States Patent
Zhang

(10) Patent No.: US 9,703,144 B2
(45) Date of Patent: Jul. 11, 2017

(54) TRICHROMATIC ILLUMINATING MODULE, BACKLIGHT MODULE AND LIQUID CRYSTAL DISPLAY PANEL

(71) Applicant: Wuhan China Star Optoelectronics Technology Co., Ltd., Wuhan, Hubei (CN)

(72) Inventor: Yanxue Zhang, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 69 days.

(21) Appl. No.: 14/655,556

(22) PCT Filed: May 21, 2015

(86) PCT No.: PCT/CN2015/079469
§ 371 (c)(1),
(2) Date: Jun. 25, 2015

(87) PCT Pub. No.: WO2016/173015
PCT Pub. Date: Nov. 3, 2016

(65) Prior Publication Data
US 2016/0320549 A1    Nov. 3, 2016

(30) Foreign Application Priority Data

Apr. 29, 2015  (CN) .......................... 2015 1 0216929

(51) Int. Cl.
G02F 1/1335    (2006.01)
F21V 8/00      (2006.01)

(52) U.S. Cl.
CPC ..... *G02F 1/133621* (2013.01); *G02B 6/0083* (2013.01); *G02F 2201/52* (2013.01)

(58) Field of Classification Search
None
See application file for complete search history.

(56) References Cited

U.S. PATENT DOCUMENTS

2006/0279671 A1* 12/2006 Han .................. G02F 1/133603
349/61

* cited by examiner

*Primary Examiner* — Richard Kim
(74) *Attorney, Agent, or Firm* — Andrew C. Cheng

(57) ABSTRACT

The disclosure provides a trichromatic illuminating module, comprising a circuit board and multiple illuminating units disposed on the circuit board. Each illuminating unit comprises a red chip, a green chip and a blue chip disposed on the circuit board, and intervals are set therebetween, a voltage is applied to the circuit board for illuminating the red chip, the green chip and the blue chip. There are more red chips than green chips and blue chips in each illuminating unit. Thus, the ratio of red light is increased. Since red light has the highest color gamut in the three primary colors, which causes it difficult for the saturation of color gamut. However, the ratio of red light of the disclosure is increased, such that the color saturation of white light emitted from the trichromatic illuminating module is increased. The disclosure also provides a backlight module and a liquid crystal display device.

6 Claims, 3 Drawing Sheets

TRICHROMATIC ILLUMINATING MODULE, BACKLIGHT MODULE AND LIQUID CRYSTAL DISPLAY PANEL

CROSS-REFERENCE TO RELATED APPLICATION

This application claims the benefit of, and priority to, Chinese Patent Application No. 201510216929.2, filed Apr. 29, 2015, titled "A trichromatic illuminating module, backlight module and liquid crystal display panel", the entire contents of which are incorporated by reference herein in its entirety.

BACKGROUND

Technical Field

The disclosure is related to the field of electronics, and more particularly to a trichromatic illuminating module, a backlight module and a liquid crystal display device.

Description of Related Art

Accompanied with the development of consumer electronics products, it is more and more important to have high color gamut for the products. Currently, blue chips and yellow fluorescent powders are used to obtain white light in LEDs. However, it is difficult for the obtained white light to achieve color saturation.

SUMMARY

The disclosure provides a trichromatic illuminating module, a backlight module and a liquid crystal display device so as to increase color saturation.

In order to achieve the above purposes, the disclosure provides the following technical solutions.

The disclosure provides a trichromatic illuminating module, comprising a circuit board and a plurality of illuminating units disposed on the circuit board. Each illuminating unit comprises a red chip, a green chip and a blue chip. The red chip, the green chip and the blue chip are disposed on the circuit board, and intervals are set between the red chip, the green chip and the blue chip. A voltage is applied to the circuit board for illuminating the red chip, the green chip and the blue chip. The amount of the red chips is greater than the amount of the green chips in each of the illuminating unit, and the amount of the red chips is greater than the amount of the blue chips in each of the illuminating unit.

In one embodiment, the ratio of the amount of the red chip, the green chip and the blue chip in each of the illuminating unit is 3:1:1.

In one embodiment, the red chip comprises a first red chip, a second red chip and a third red chip, a first end of the first red chip is connected with a blue chip of an adjacent first illuminating unit, a second end of the first red chip is connected with a first end of the green chip, a second end of the first green chip is connected with a first end of the blue chip, a second end of the blue chip is connected with a first end of a first red chip of an adjacent illuminating unit, a first end of the second red chip is connected with the first end of the first red chip, a second end of the second red chip is connected with the second end of the blue chip, a first end of the third red chip is connected with the first end of the first red chip, and a second end of the third red chip is connected with the second end of the blue chip.

In one embodiment, the distance between the first red chip and the green chip equals to the distance between the first red chip and a blue chip of an adjacent illuminating unit, the distance between the green chip and the first red chip equals to the distance between the green chip and the first blue chip, and the distance between the blue chip and the green chip equals to the distance between the blue chip and a first red chip of an adjacent illuminating unit.

The disclosure further provides a backlight module, comprising a light guiding plate and an illuminating module. The light guiding plate is configured for guiding a light emitted from the illuminating module. The illuminating module comprises a circuit board and a plurality of illuminating units disposed on the circuit board. Each illuminating unit comprises a red chip, a green chip and a blue chip. The red chip, the green chip and the blue chip are disposed on the circuit board, and intervals are set between the red chip, the green chip and the blue chip. A voltage is applied to the circuit board for illuminating the red chip, the green chip and the blue chip. The amount of the red chips is greater than the amount of the green chips in each of the illuminating unit, and the amount of the red chips is greater than the amount of the blue chips in each of the illuminating unit.

In one embodiment, the ratio of the amount of the red chip, the green chip and the blue chip in each of the illuminating unit is 3:1:1.

In one embodiment, the red chip comprises a first red chip, a second red chip and a third red chip, a first end of the first red chip is connected with a blue chip of an adjacent first illuminating unit, a second end of the first red chip is connected with a first end of the green chip, a second end of the first green chip is connected with a first end of the blue chip, a second end of the blue chip is connected with a first end of a first red chip of an adjacent illuminating unit, a first end of the second red chip is connected with the first end of the first red chip, a second end of the second red chip is connected with the second end of the blue chip, a first end of the third red chip is connected with the first end of the first red chip, and a second end of the third red chip is connected with the second end of the blue chip.

In one embodiment, the distance between the first red chip and the green chip equals to the distance between the first red chip and a blue chip of an adjacent illuminating unit, the distance between the green chip and the first red chip equals to the distance between the green chip and the first blue chip, and the distance between the blue chip and the green chip equals to the distance between the blue chip and a first red chip of an adjacent illuminating unit.

The disclosure further provides a liquid crystal display device, comprising a liquid crystal screen and a backlight module. A light emitted from the backlight module is irradiated on the liquid crystal of the liquid crystal display screen. The backlight module comprises a light guiding plate and an illuminating module. The light guiding plate is configured for guiding a light emitted from the illuminating module. The illuminating module comprises a circuit board and a plurality of illuminating units disposed on the circuit board. Each illuminating unit comprises a red chip, a green chip and a blue chip. The red chip, the green chip and the blue chip are disposed on the circuit board, and intervals are set between the red chip, the green chip and the blue chip. A voltage is applied to the circuit board for illuminating the red chip, the green chip and the blue chip. The amount of the red chips is greater than the amount of the green chips in each of the illuminating unit, and the amount of the red chips is greater than the amount of the blue chips in each of the illuminating unit.

In one embodiment, the ratio of the amount of the red chip, the green chip and the blue chip in each of the illuminating unit is 3:1:1.

In one embodiment, the red chip comprises a first red chip, a second red chip and a third red chip, a first end of the first red chip is connected with a blue chip of an adjacent first illuminating unit, a second end of the first red chip is connected with a first end of the green chip, a second end of the first green chip is connected with a first end of the blue chip, a second end of the blue chip is connected with a first end of a first red chip of an adjacent illuminating unit, a first end of the second red chip is connected with the first end of the first red chip, a second end of the second red chip is connected with the second end of the blue chip, a first end of the third red chip is connected with the first end of the first red chip, and a second end of the third red chip is connected with the second end of the blue chip.

In one embodiment, the distance between the first red chip and the green chip equals to the distance between the first red chip and a blue chip of an adjacent illuminating unit, the distance between the green chip and the first red chip equals to the distance between the green chip and the first blue chip, and the distance between the blue chip and the green chip equals to the distance between the blue chip and a first red chip of an adjacent illuminating unit.

The disclosure provides a trichromatic illuminating module, comprising a circuit board and a plurality of illuminating units disposed on the circuit board. Each illuminating unit comprises a red chip, a green chip and a blue chip. The red chip, the green chip and the blue chip are disposed on the circuit board, and intervals are set between the red chip, the green chip and the blue chip. A voltage is applied to the circuit board for illuminating the red chip, the green chip and the blue chip. There are more red chips than green chips in each of the illuminating unit, and there are more red chips than blue chips in each of the illuminating unit. Thus, the ratio of red light is increased. Since red light has the highest color gamut in the three primary colors (red, green and blue), which causes it difficult for the saturation of color gamut. However, the ratio of red light of the disclosure is increased, such that the color saturation of white light emitted from the trichromatic illuminating module is increased.

In order to more clearly illustrate the features and technical solutions of the disclosure, the accompanying descriptions and drawings are described as blow. It is apparently that the drawings below are merely some embodiments of the disclosure, which do not limit the scope of the disclosure.

BRIEF DESCRIPTION OF THE DRAWINGS

In order to more clearly illustrate the embodiments of the disclosure, the accompanying drawings for illustrating the technical solutions and the technical solutions of the disclosure are briefly described as below.

DETAILED DESCRIPTION OF EMBODIMENTS

The following description with reference to the accompanying drawings is provided to clearly and completely explain the exemplary embodiments of the disclosure. It is apparent that the following embodiments are merely some embodiments of the disclosure rather than all embodiments of the disclosure. According to the embodiments in the disclosure, all the other embodiments attainable by those skilled in the art without creative endeavor belong to the protection scope of the disclosure.

Figure 1:
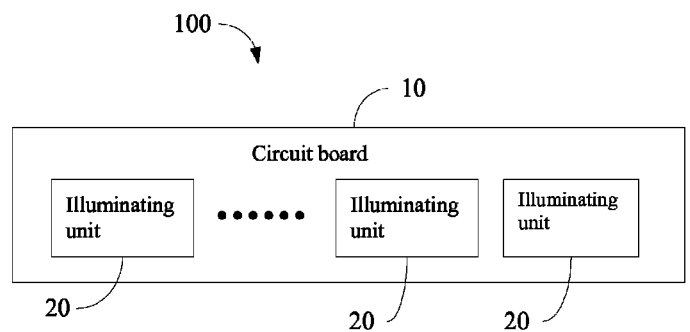
FIG. 1 is a block diagram of the trichromatic illuminating module according to the first embodiment the disclosure.
Figure 2:
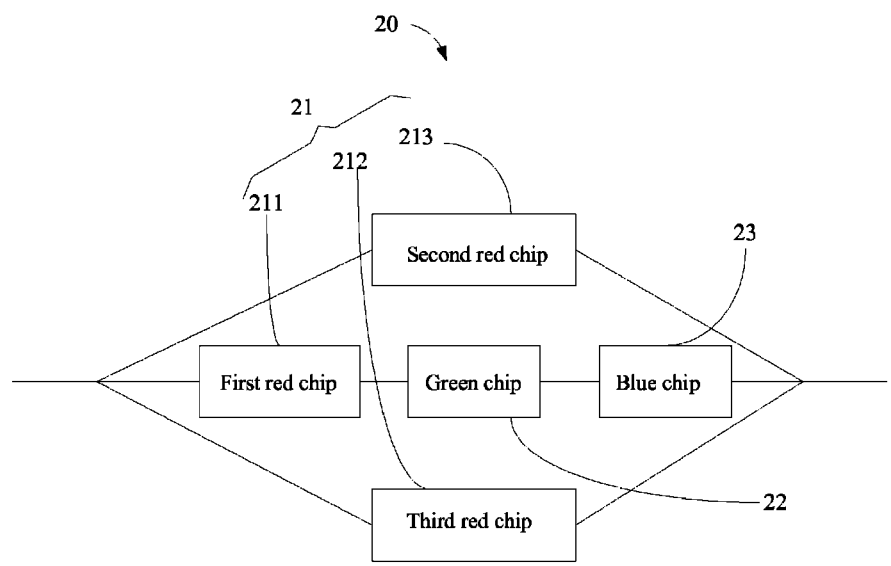
FIG. 2 is a block diagram of the illuminating unit in FIG. 1.

Referring to FIGS. 1 and 2, a first embodiment of the disclosure provides a trichromatic illuminating module 100. The trichromatic illuminating module 100 comprises a circuit board 10 and a plurality of illuminating units 20 disposed on the circuit board 10. Each illuminating unit 20 comprises a red chip 21, a green chip 22 and a blue chip 23. The red chip 21, the green chip 22 and the blue chip 23 are disposed on the circuit board 10, and intervals are set between the red chip 21, the green chip 22 and the blue chip 23. A voltage is applied to the circuit board 10 for illuminating the red chip 21, the green chip 22 and the blue chip 23. There are more red chips 21 than green chips 22 in each of the illuminating unit 20, and there are more red chips 21 than blue chips 23 in each of the illuminating unit 20.

In this embodiment, there are more red chips 21 than green chips 22, in each of the illuminating unit 20, and there are more red chips 21 than blue chips 23 in each of the illuminating unit 20, such that the ratio of red light is increased. Since red light has the highest color gamut in the three primary colors (red, green and blue), which causes it difficult for the saturation of color gamut. However, the ratio of red light of the embodiment is increased, such that the color saturation of white light emitted from the trichromatic illuminating module 100 is increased.

Specifically, the ratio of the amount of the red chip 21, the green chip 22 and the blue chip 23 in each of the illuminating unit 20 is 3:1:1.

According to experiment results, when the ratio of the amount of the red chip 21, the green chip 22 and the blue chip 23 in each of the illuminating unit 20 is 3:1:1, the color saturation of white light emitted from the trichromatic illuminating module 100 is highest.

In other embodiments, one can adjust the ratio of the amount of the red chip 21, the green chip 22 and the blue chip 23 according to their needs.

Optionally, in this embodiment, the red chip 21 comprises a first red chip 211, a second red chip 212 and a third red chip 213. A first end of the first red chip 211 is connected with a blue chip (not shown in the figure) of an adjacent illuminating unit 21. A second end of the first red chip 211 is connected with a first end of the green chip 22. A second end of the first green chip 212 is connected with a first end of the blue chip 23. A second end of the blue chip 23 is connected with a first end of a first red chip (not shown in the figure) of an adjacent illuminating unit 20. A first end of the second red chip 212 is connected with the first end of the first red chip 211. A second end of the second red chip 212 is connected with the second end of the blue chip 23. A first end of the third red chip 213 is connected with the first end of the first red chip 211. A second end of the third red chip 213 is connected with the second end of the blue chip 23.

Optionally, the distance between the first red chip 211 and the green chip 22 equals to the distance between the first red chip 211 and a blue chip of an adjacent illuminating unit 20; the distance between the green chip 22 and the first red chip 211 equals to the distance between the green chip 22 and the blue chip; the distance between the blue chip 23 and the green chip 22 equals to the distance between the blue chip 23 and a first red chip (not shown in the figure) of an adjacent illuminating unit 20.

Figure 3:
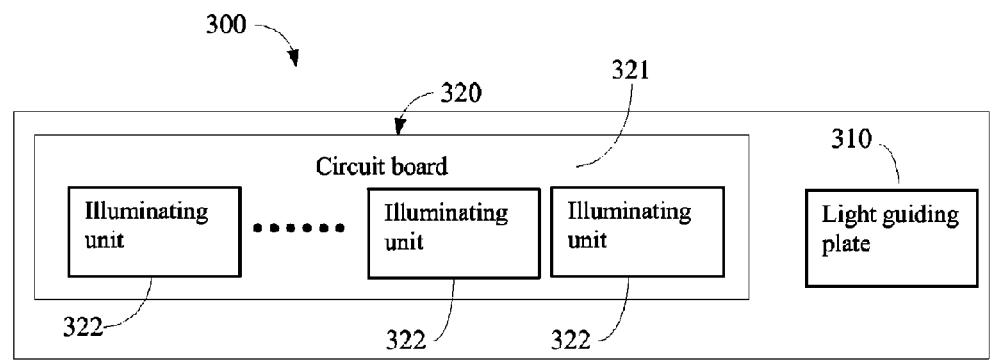
FIG. 3 is a block diagram of the backlight module according to the second embodiment the disclosure.
Figure 4:
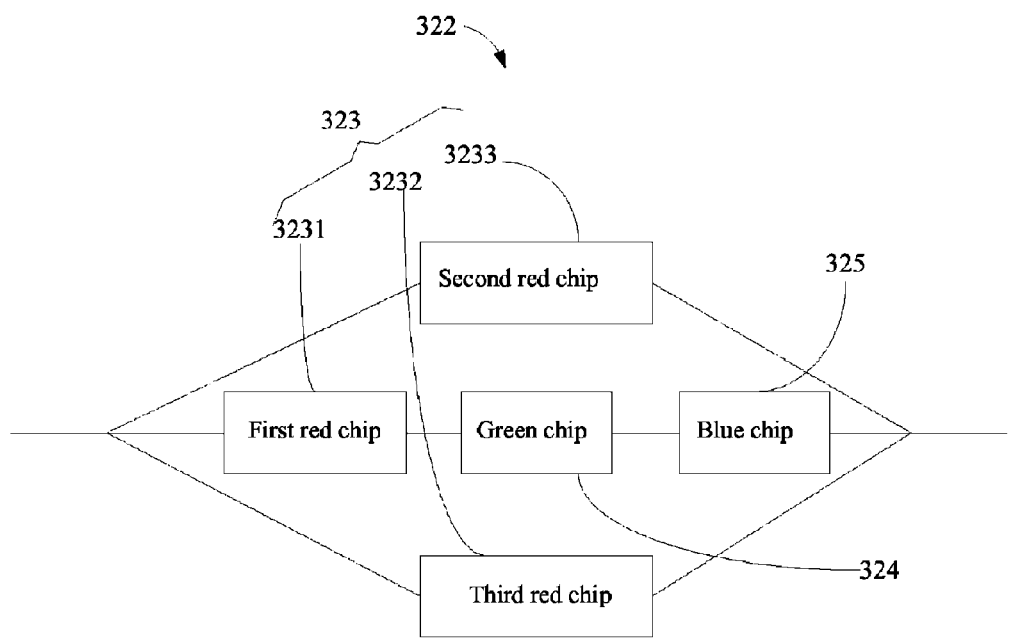
FIG. 4 is a block diagram of the illuminating unit in FIG. 3.

Referring to FIGS. 3 and 4, a second embodiment of the disclosure provides a backlight module 300. The backlight module 300 comprises a light guiding plate 310 and an illuminating module 320. The light guiding plate 310 is configured for guiding a light emitted from the illuminating module 320. The illuminating module 320 comprises a circuit board 321 and a plurality of illuminating units 322 disposed on the circuit board 321. Each illuminating unit 322 comprises a red chip 323, a green chip 324 and a blue chip 325. The red chip 323, the green chip 324 and the blue chip 325 are disposed on the circuit board 321, and intervals are set between the red chip 323, the green chip 324 and the blue chip 325. A voltage is applied to the circuit board 321 for illuminating the red chip 323, the green chip 324 and the blue chip 325. There are more red chips 323 than green chips 324 in each of the illuminating unit 322, and there are more red chips 323 than blue chips 325 in each of the illuminating unit 322.

In this embodiment, there are more red chips 323 than green chips 324, in each of the illuminating unit 322, and there are more red chips 323 than blue chips 325 in each of the illuminating unit 322, such that the ratio of red light is increased. Since red light has the highest color gamut in the three primary colors (red, green and blue), which causes it difficult for the saturation of color gamut. However, the ratio of red light of the embodiment is increased, such that the color saturation of white light emitted from the backlight module 300 is increased.

Specifically, the ratio of the amount of the red chip 323, the green chip 324 and the blue chip 325 in each of the illuminating unit 20 is 3:1:1.

According to experiment results, when the ratio of the amount of the red chip 323, the green chip 324 and the blue chip 325 in each of the illuminating unit 322 is 3:1:1, the color saturation of white light emitted from the backlight module 300 is highest.

In other embodiments, one can adjust the ratio of the amount of the red chip 323, the green chip 324 and the blue chip 325 according to their needs.

Optionally, in this embodiment, the red chip 323 comprises a first red chip 3231, a second red chip 3232 and a third red chip 3233. A first end of the first red chip 3231 is connected with a blue chip (not shown in the figure) of an adjacent illuminating unit 322. A second end of the first red chip 3231 is connected with a first end of the green chip 324. A second end of the first green chip 324 is connected with a first end of the blue chip 325. A second end of the blue chip 325 is connected with a first end of a first red chip (not shown in the figure) of an adjacent illuminating unit 322. A first end of the second red chip 3232 is connected with the first end of the first red chip 3231. A second end of the second red chip 3232 is connected with the second end of the blue chip 325. A first end of the third red chip 3233 is connected with the first end of the first red chip 3231. A second end of the third red chip 3233 is connected with the second end of the blue chip 325.

Optionally, the distance between the first red chip 3231 and the green chip 324 equals to the distance between the first red chip 3231 and a blue chip of an adjacent illuminating unit 322; the distance between the green chip 324 and the first red chip 3231 equals to the distance between the green chip 324 and the blue chip 325; the distance between the blue chip 325 and the green chip 324 equals to the distance between the blue chip 325 and a first red chip (not shown in the figure) of an adjacent illuminating unit 322.

Figure 5:
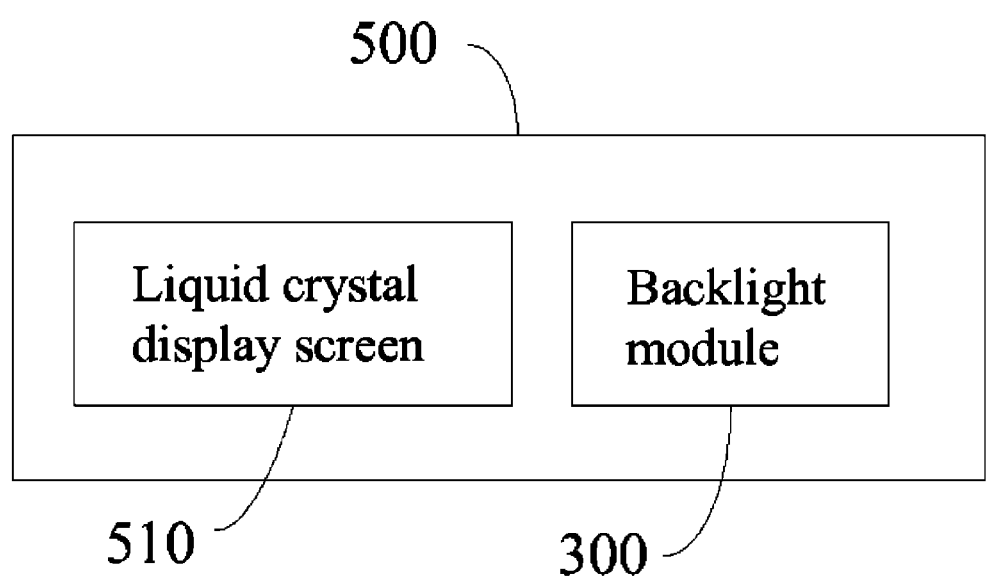
FIG. 5 is a block diagram of the liquid crystal display device according to the third embodiment the disclosure.

Referring to FIG. 5, a third embodiment of the disclosure provides a liquid crystal display device 500. The liquid crystal display device 500 comprises a liquid crystal display screen 510 and a backlight module. A light emitted from the backlight module is irradiated on the liquid crystal of the liquid crystal display screen 510. The backlight module is the backlight module 300 described in the above second embodiment.

Specifically, the backlight module 300 comprises a light guiding plate 310 and an illuminating module 320. The light guiding plate 310 is configured for guiding a light emitted from the illuminating module 320. The illuminating module 320 comprises a circuit board 321 and a plurality of illuminating units 322 disposed on the circuit board 321. Each illuminating unit 322 comprises a red chip 323, a green chip 324 and a blue chip 325. The red chip 323, the green chip 324 and the blue chip 325 are disposed on the circuit board 321, and intervals are set between the red chip 323, the green chip 324 and the blue chip 325. A voltage is applied to the circuit board 321 for illuminating the red chip 323, the green chip 324 and the blue chip 325. There are more red chips 323 than green chips 324 in each of the illuminating unit 322, and there are more red chips 323 than blue chips 325 in each of the illuminating unit 322.

In this embodiment, there are more red chips 323 than green chips 324, in each of the illuminating unit 322, and there are more red chips 323 than blue chips 325 in each of the illuminating unit 322, such that the ratio of red light is increased. Since red light has the highest color gamut in the three primary colors (red, green and blue), which causes it difficult for the saturation of color gamut. However, the ratio of red light of the embodiment is increased, such that the color saturation of white light emitted from the backlight module 300 is increased.

Specifically, the ratio of the amount of the red chip 323, the green chip 324 and the blue chip 325 in each of the illuminating unit 20 is 3:1:1.

According to experiment results, when the ratio of the amount of the red chip 323, the green chip 324 and the blue chip 325 in each of the illuminating unit 322 is 3:1:1, the color saturation of white light emitted from the backlight module 300 is highest.

In other embodiments, one can adjust the ratio of the amount of the red chip 323, the green chip 324 and the blue chip 325 according to their needs.

Optionally, in this embodiment, the red chip 323 comprises a first red chip 3231, a second red chip 3232 and a third red chip 3233. A first end of the first red chip 3231 is connected with a blue chip (not shown in the figure) of an adjacent illuminating unit 322. A second end of the first red chip 3231 is connected with a first end of the green chip 324. A second end of the first green chip 324 is connected with a first end of the blue chip 325. A second end of the blue chip 325 is connected with a first end of a first red chip (not shown in the figure) of an adjacent illuminating unit 322. A first end of the second red chip 3232 is connected with the first end of the first red chip 3231. A second end of the second red chip 3232 is connected with the second end of the blue chip 325. A first end of the third red chip 3233 is connected with the first end of the first red chip 3231. A second end of the third red chip 3233 is connected with the second end of the blue chip 325.

Optionally, the distance between the first red chip 3231 and the green chip 324 equals to the distance between the first red chip 3231 and a blue chip of an adjacent illuminating unit 322; the distance between the green chip 324 and the first red chip 3231 equals to the distance between the green chip 324 and the blue chip 325; the distance between the blue chip 325 and the green chip 324 equals to the distance between the blue chip 325 and a first red chip (not shown in the figure) of an adjacent illuminating unit 322.

Note that the specifications relating to the above embodiments should be construed as exemplary rather than as limitative of the present disclosure. The equivalent variations and modifications on the structures or the process by reference to the specification and the drawings of the disclosure, or application to the other relevant technology fields directly or indirectly should be construed similarly as falling within the protection scope of the disclosure.

What is claimed is:

1. A trichromatic illuminating module, comprising:
a circuit board;
a plurality of illuminating unit disposed on the circuit board, wherein each illuminating unit comprises a red chip, a green chip and a blue chip; the red chip, the green chip and the blue chip are disposed on the circuit board, and intervals are set between the red chip, the green chip and the blue chip; a voltage is applied to the circuit board for illuminating the red chip, the green chip and the blue chip; the amount of the red chip is greater than the amount of the green chip in each of the illuminating unit, and the amount of the red chip is greater than the amount of the blue chip in each of the illuminating unit,
wherein the ratio of the amount of the red chip, the green chip and the blue chip in each of the illuminating unit is 3:1:1,
wherein the red chip comprises a first red chip, a second red chip and a third red chip, a first end of the first red chip is connected with a blue chip of an adjacent first illuminating unit, a second end of the first red chip is connected with a first end of the green chip, a second end of the first green chip is connected with a first end of the blue chip, a second end of the blue chip is connected with a first end of a first red chip of an adjacent illuminating unit, a first end of the second red chip is connected with the first end of the first red chip, a second end of the second red chip is connected with the second end of the blue chip, a first end of the third red chip is connected with the first end of the first red chip, and a second end of the third red chip is connected with the second end of the blue chip.

2. The trichromatic illuminating module according to claim 1, wherein the distance between the first red chip and the green chip equals to the distance between the first red chip and a blue chip of an adjacent illuminating unit, the distance between the green chip and the first red chip equals to the distance between the green chip and the first blue chip, and the distance between the blue chip and the green chip equals to the distance between the blue chip and a first red chip of an adjacent illuminating unit.

3. A backlight module, comprising:
a light guiding plate; and
an illuminating module;
wherein the light guiding plate is configured for guiding a light emitted from the illuminating module;
wherein the illuminating module comprises:
a circuit board; and
a plurality of illuminating unit disposed on the circuit board, wherein each illuminating unit comprises a red chip, a green chip and a blue chip; the red chip, the green chip and the blue chip are disposed on the circuit board, and intervals are set between the red chip, the green chip and the blue chip; a voltage is applied to the circuit board for illuminating the red chip, the green chip and the blue chip; the amount of the red chip is greater than the amount of the green chip in each of the illuminating unit, and the amount of the red chip is greater than the amount blue chip in each of the illuminating unit,
wherein the ratio of the amount of the red chip, the green chip and the blue chip in each of the illuminating unit is 3:1:1,
wherein the red chip comprises a first red chip, a second red chip and a third red chip, a first end of the first red chip is connected with a blue chip of an adjacent first illuminating unit, a second end of the first red chip is connected with a first end of the green chip, a second end of the first green chip is connected with a first end of the blue chip, a second end of the blue chip is connected with a first end of a first red chip of an adjacent illuminating unit, a first end of the second red chip is connected with the first end of the first red chip, a second end of the second red chip is connected with the second end of the blue chip, a first end of the third red chip is connected with the first end of the first red chip, and a second end of the third red chip is connected with the second end of the blue chip.

4. The backlight module according to claim 3, wherein the distance between the first red chip and the green chip equals to the distance between the first red chip and a blue chip of an adjacent illuminating unit, the distance between the green chip and the first red chip equals to the distance between the green chip and the first blue chip, and the distance between the blue chip and the green chip equals to the distance between the blue chip and a first red chip of an adjacent illuminating unit.

5. A liquid crystal display device, comprising:
a liquid crystal display screen; and
a backlight module;
wherein a light emitted from the backlight module is irradiated on the liquid crystal of the liquid crystal display screen;
wherein the backlight module comprises:
a light guiding plate; and
an illuminating module;
wherein the light guiding plate is configured for guiding a light emitted from the illuminating module;
wherein the illuminating module comprises:
a circuit board; and
a plurality of illuminating unit disposed on the circuit board, wherein each illuminating unit comprises a red chip, a green chip and a blue chip; the red chip, the green chip and the blue chip are disposed on the circuit board, and intervals are set between the red chip, the green chip and the blue chip; a voltage is applied to the circuit board for illuminating the red chip, the green chip and the blue chip; the amount of the red chip is greater than the amount of the green chip in each of the illuminating unit, and the amount of the red chip is greater than the amount of the blue chip in each of the illuminating unit,
wherein the ratio of the amount of the red chip, the green chip and the blue chip in each of the illuminating unit is 3:1:1,
wherein the red chip comprises a first red chip, a second red chip and a third red chip, a first end of the first red chip is connected with a blue chip of an adjacent first illuminating unit, a second end of the first red chip is connected with a first end of the green chip, a second end of the first green chip is connected with a first end of the blue chip, a second end of the blue chip is connected with a first end of a first red chip of an adjacent illuminating unit, a first end of the second red chip is connected with the first end of the first red chip, a second end of the second red chip is connected with the second end of the blue chip, a first end of the third red chip is connected with the first end of the first red chip, and a second end of the third red chip is connected with the second end of the blue chip.

6. The liquid crystal display device according to claim 5, wherein the distance between the first red chip and the green chip equals to the distance between the first red chip and a blue chip of an adjacent illuminating unit, the distance between the green chip and the first red chip equals to the distance between the green chip and the first blue chip, and the distance between the blue chip and the green chip equals to the distance between the blue chip and a first red chip of an adjacent illuminating unit.

* * * * *

UNITED STATES PATENT AND TRADEMARK OFFICE
CERTIFICATE OF CORRECTION

PATENT NO. : 9,703,144 B2
APPLICATION NO. : 14/655556
DATED : July 11, 2017
INVENTOR(S) : Yanxue Zhang Page 1 of 1

It is certified that error appears in the above-identified patent and that said Letters Patent is hereby corrected as shown below:

On the Title Page

(73) Assignee should read: "Wuhan China Star Optoelectronics Technology Co., Ltd; Wuhan, Hubei, China"

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*